June 14, 1960  D. M. RICHEY  2,940,539
POWER-OPERATED BOOM STRUCTURE

Filed March 16, 1956  10 Sheets-Sheet 1

INVENTOR
David M. Richey
BY  *Rockwell & Bartholow*
ATTORNEY

June 14, 1960

D. M. RICHEY 2,940,539

POWER-OPERATED BOOM STRUCTURE

Filed March 16, 1956

INVENTOR

David M. Richey

BY Rockwell & Bartholow

ATTORNEYS

INVENTOR
David M. Richey
BY Rockwell + Bartholow
ATTORNEYS

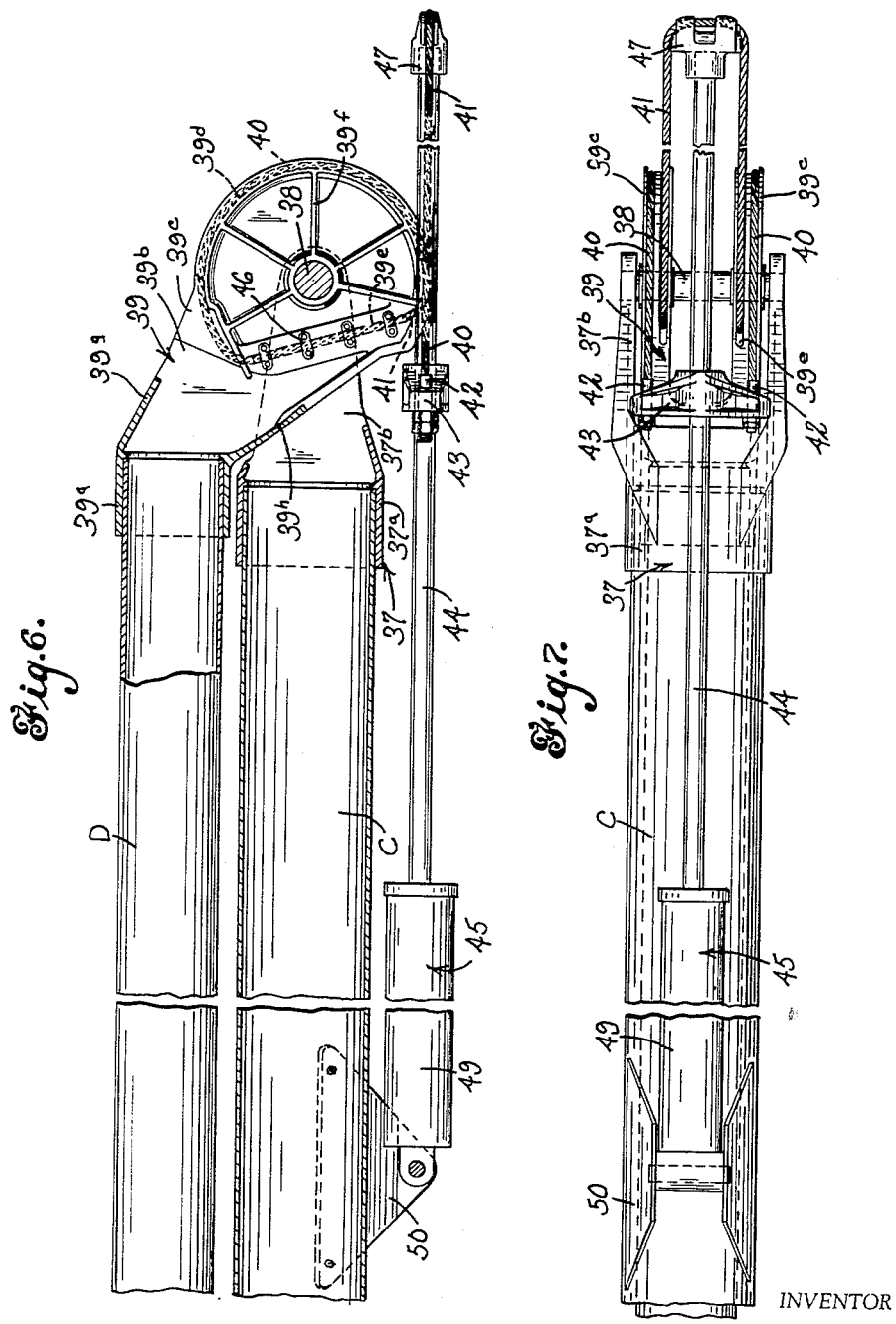

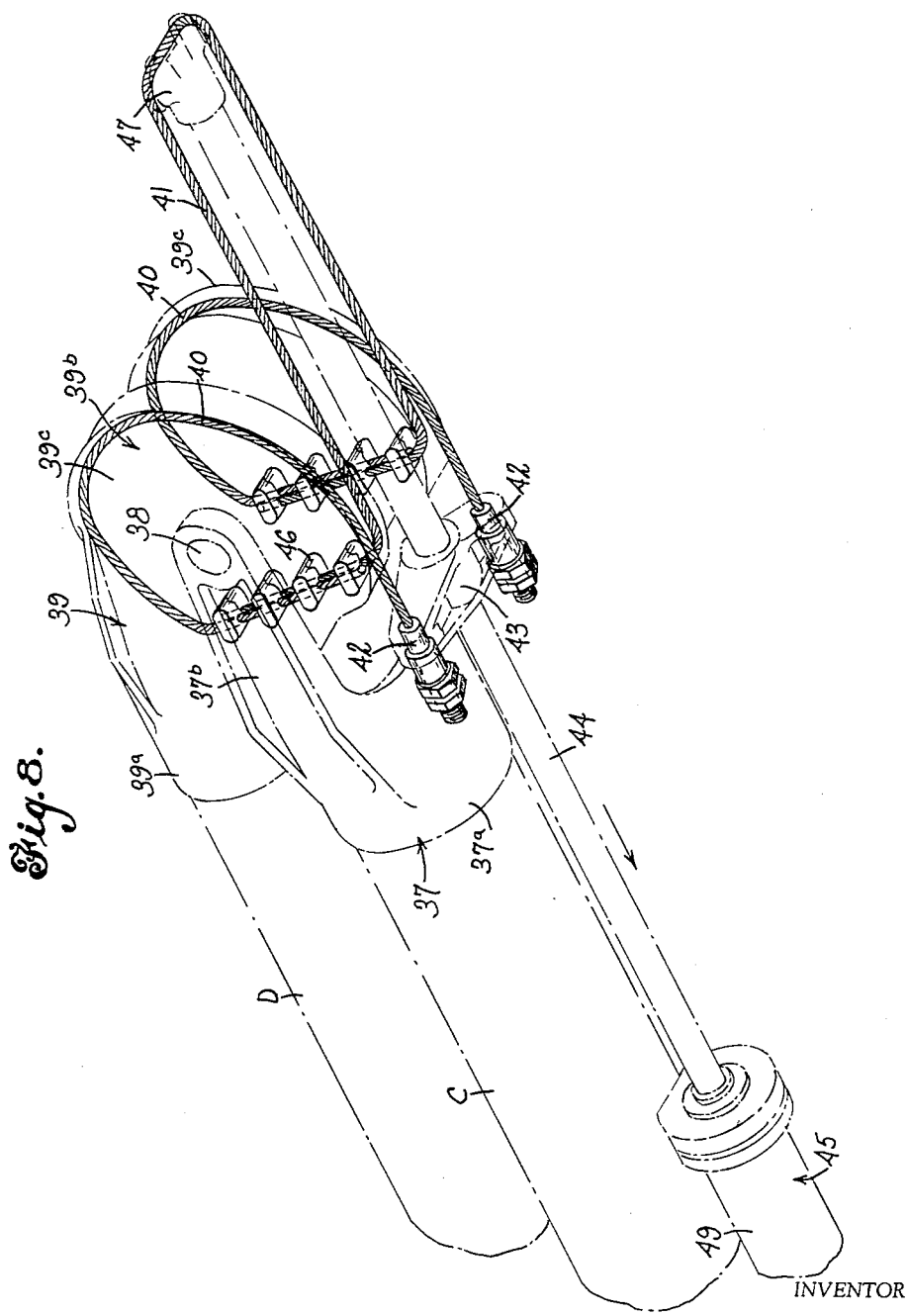

June 14, 1960 D. M. RICHEY 2,940,539
POWER-OPERATED BOOM STRUCTURE
Filed March 16, 1956 10 Sheets-Sheet 8

INVENTOR
David M. Richey
BY Rockwell + Bartholow
ATTORNEYS

June 14, 1960  D. M. RICHEY  2,940,539
POWER-OPERATED BOOM STRUCTURE
Filed March 16, 1956
10 Sheets-Sheet 9

INVENTOR
David M. Richey
BY Rockwell + Bartholow
ATTORNEYS

June 14, 1960  D. M. RICHEY  2,940,539
POWER-OPERATED BOOM STRUCTURE
Filed March 16, 1956  10 Sheets-Sheet 10
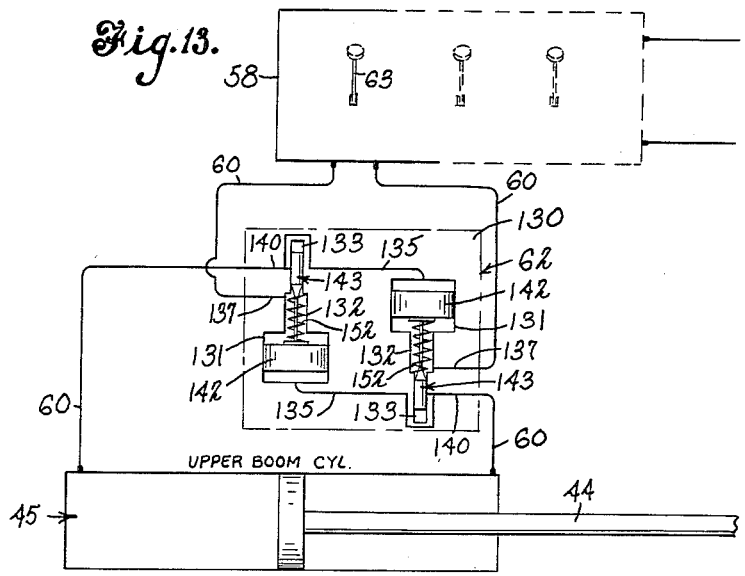
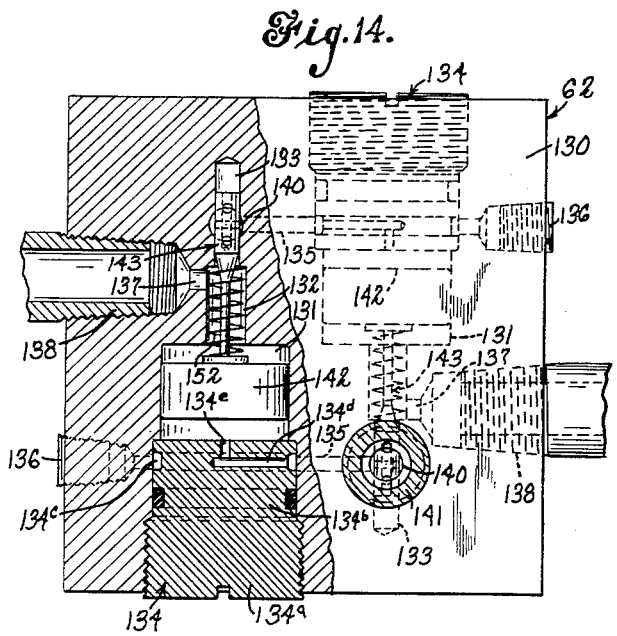
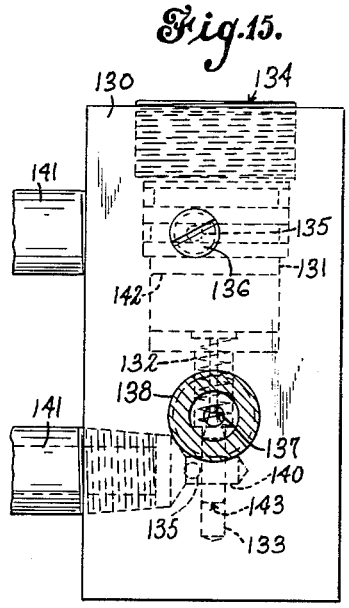
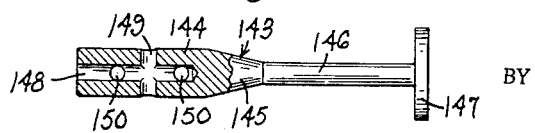
INVENTOR
David M. Richey
BY Rockwell & Bartholow
ATTORNEYS United States Patent Office 2,940,539
Patented June 14, 1960

2,940,539

POWER-OPERATED BOOM STRUCTURE

David M. Richey, Woodbridge, Conn., assignor, by mesne assignments, to Emhart Manufacturing Company, Hartford, Conn., a corporation of Delaware Filed Mar. 16, 1956, Ser. No. 572,037

14 Claims. (Cl. 182—2)

This invention relates to power-operated boom structures and relates more particularly to articulated boom structures of the type employed to lift a tree surgeon, for example, a distance above the ground for work in trees.

One object of the invention is to provide, in a structure such as characterized above and including multiple booms, improved means for operating the booms.

Another object of the invention is to provide an improved structure comprising two booms pivoted to one another and having great amplitude of movement.

Another object of the invention is to provide improved controls and valve means in an articulated boom structure operable by hydraulic means.

Another object of the invention is to provide an articulated boom structure having a high degree of stability and safety, which is constituted by relatively few and rugged parts, and which is economical to produce.

Further objects will be apparent from the following detailed explanation of the embodiment of the invention illustrated in the drawings by way of example.

In the accompanying drawings:

Fig. 6 is a fragmentary view in side elevation and partially in section showing the connection of the lower boom with the upper boom;

Fig. 7 is a fragmentary bottom view of the lower boom in the inoperative position thereof;

Fig. 8 is a diagrammatic view illustrating the cable means for raising and lowering the upper boom;

Fig. 10A is an enlarged fragmentary view further illustrating certain parts shown in Fig. 10;

Fig. 13 is a diagrammatic view of valve means employed in the system to restrict ingress and egress of hydraulic fluid to the fluid motor operating the upper boom;

Fig. 14 is a fragmentary view partially in section illustrating the valve means of Fig. 13;

Fig. 15 is a further view of the valve means; and

Fig. 16 is an enlarged detail view, partially in section, illustrating an element of the valve means.

Figure 1:
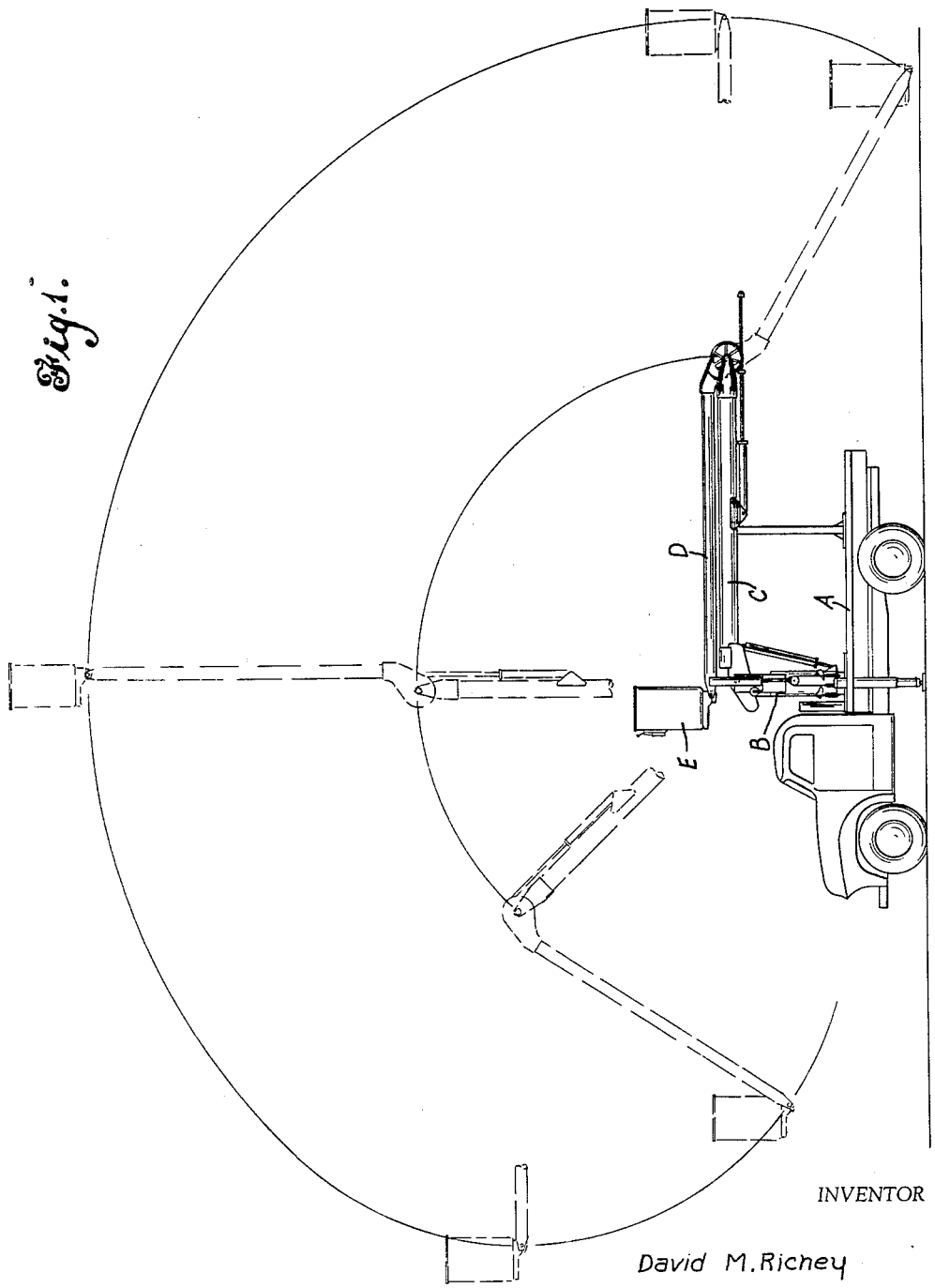
Fig. 1 is a side elevational view of a mobile articulated boom structure embodying the invention and illustrating in broken lines the amplitude of swinging movement obtainable in the use of the structure.

The articulated boom structure, shown in the drawings by way of example, is illustrated in association with a conventional truck provided with stabilizing outriggers and having a fixed rear platform supporting a rotary turret on which is provided a lower boom. While the invention is not limited thereto, the form shown consists of only two booms, the second or upper boom having one end thereof pivotally mounted on the outer end of the lower boom. A self-leveling platform or crow's nest is pivotally mounted on the outer end of the upper boom and is provided with controls for raising and lowering the booms and rotating the booms as a unit with the turret.

In the drawings, the stationary platform of the truck is indicated at A, the rotary turret at B, the lower boom at C, the upper boom at D, and the crow's nest or work platform at E. The turret B, the lower boom C and the upper boom D are all worked by cables operated by fluid motors.

Referring now to the details of the structure, the body of the turret B, which is of generally cylindrical form and constitutes an elongate support for the lower boom C, is supported on a generally cylindrical member 10 extending upwardly from the platform A in fixed relation thereto, the turret B being suitably mounted on the member 10 to rotate thereon in embracing and concentric relation. The body of the turret B is provided with an upper bifurcated extension 11 having the arms thereof receiving at their distal ends the ends of a horizontal pivot shaft 12 for the lower boom C. Rotation of the turret B about the member 10 may be effected by any suitable fluid-operated means. In the form shown, a cable drive mechanism well known in the art is generally indicated at 14. The cable drive mechanism 14 is operated by a fluid motor indicated generally at 15, comprising a fluid cylinder 15ᵃ and a piston rod 15ᵇ extensible from the cylinder to rotate the turret B in one direction and retractable to rotate the latter in the opposite direction. The cable drive mechanism 14 effects rotation of the turret B to any selected point on an arc of 360°, the construction and arrangement preferably being such that the turret B may be rotated by the drive mechanism 14 somewhat more than a complete revolution, or approximately 400°.

Figure 2:
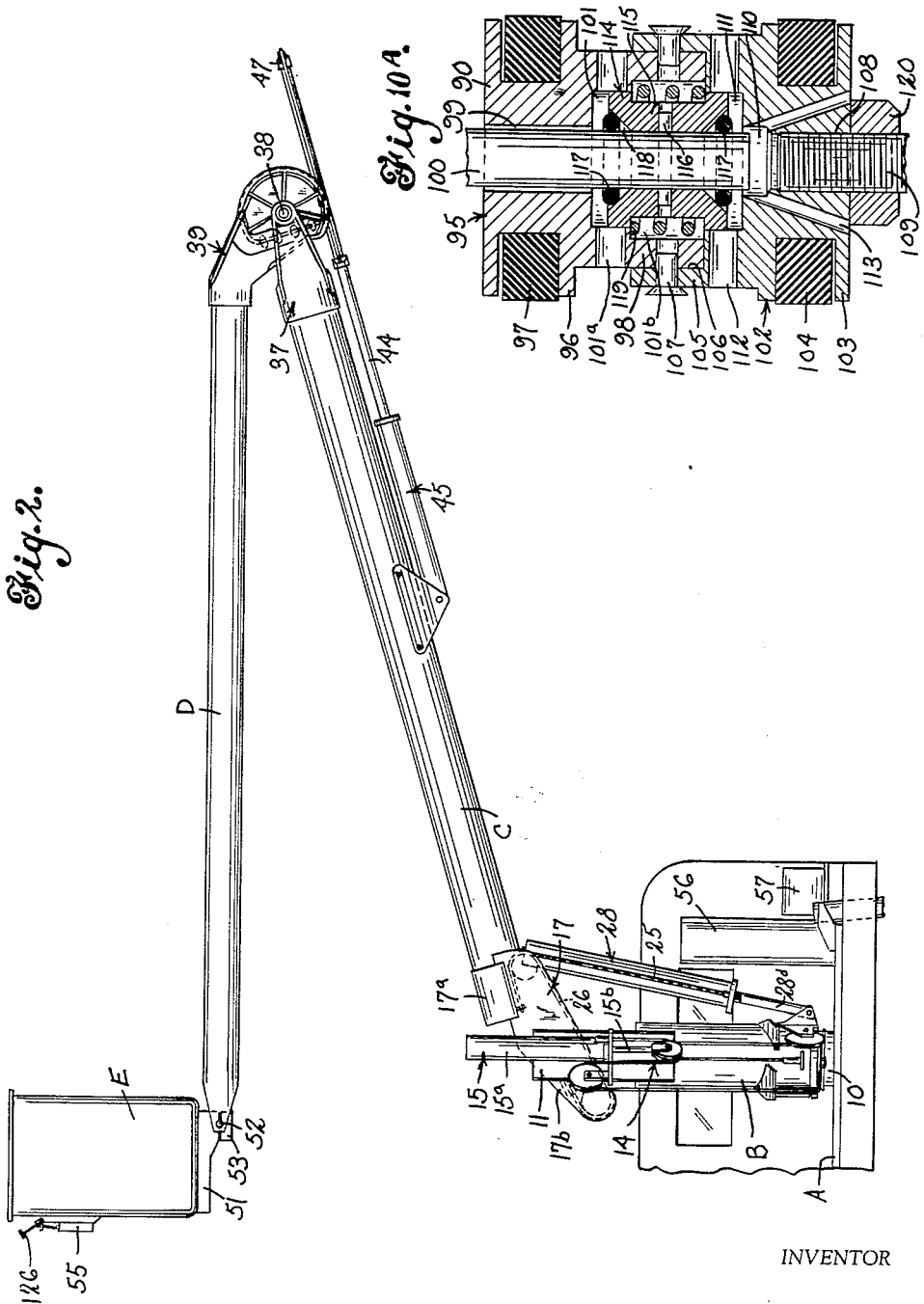
Fig. 2 is an enlarged fragmentary view in side elevation showing the upper and lower booms partially raised from their folded or inoperative positions, and further illustrating the booms rotated on a vertical axis to a position approximately 90° from the position of Fig. 1.
Figure 4:
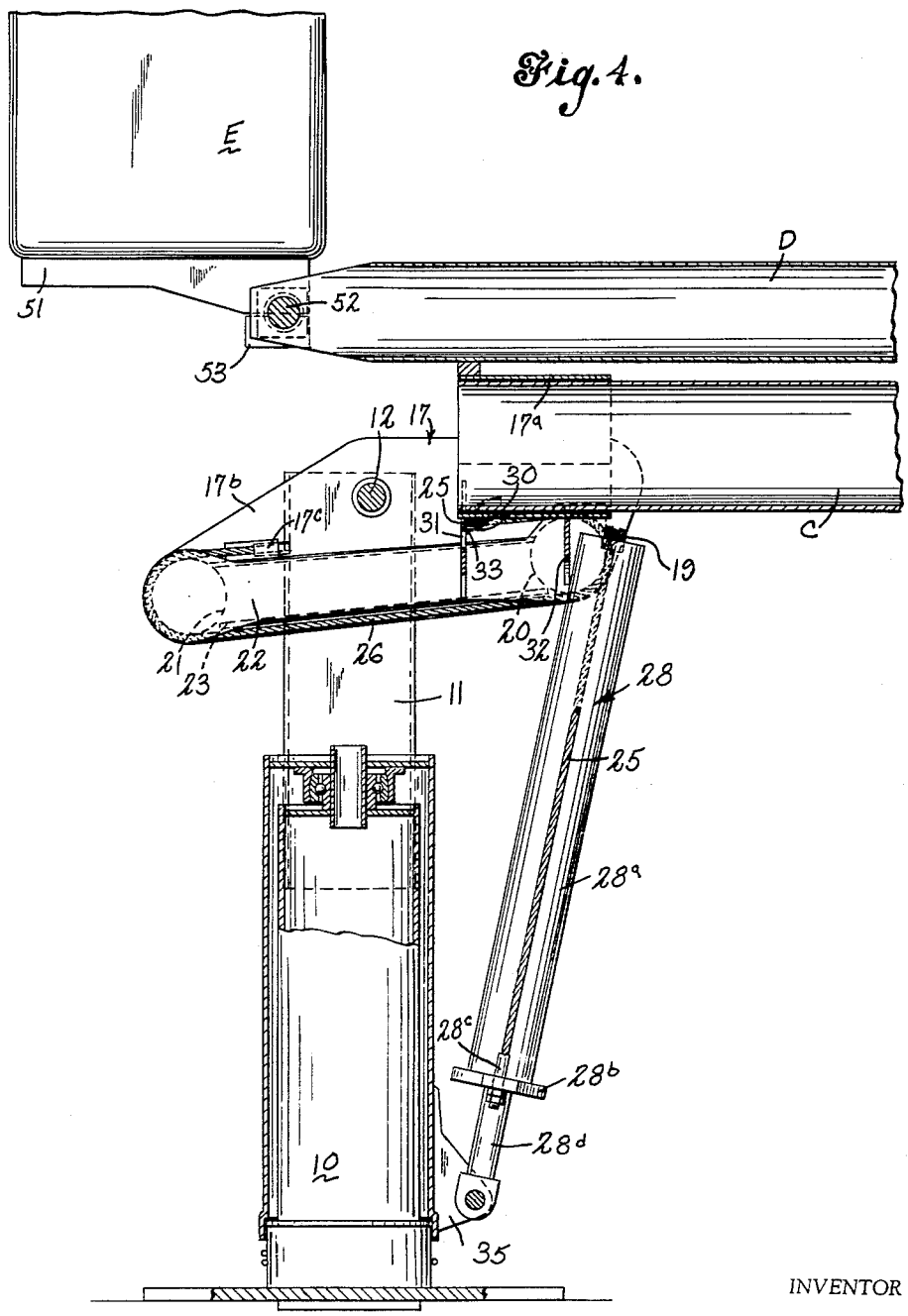
Fig. 4 is a fragmentary view showing the booms in vertical section.
Figure 5:
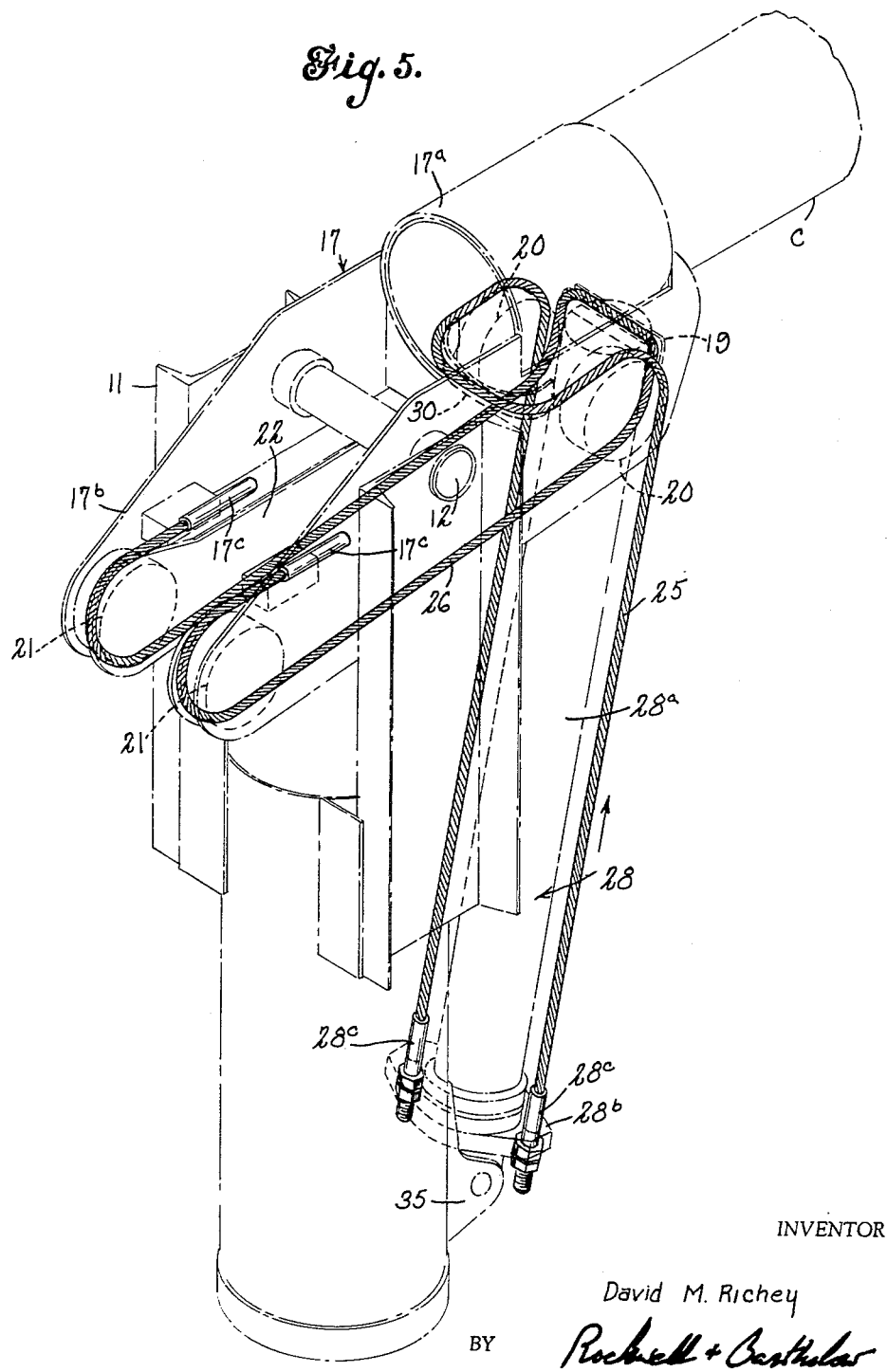
Fig. 5 is a further enlarged diagrammatic view of the cable means for raising and lowering the lower boom.

The booms C and D are preferably of hollow, generally cylindrical form and are preferably constructed of aluminum alloy. The booms C and D, which are pivotally interconnected, are folded one on the other in their inoperative positions shown in full lines in Fig. 1. The lower or inner end of the lower boom C is received in a welded steel fitting 17 having a sleeve portion 17ᵃ snugly embracing and suitably secured to the inner end of the boom C in rigid relation thereto. The fitting 17 has fixed cheek plates 17ᵇ extending generally longitudinally of the boom C and extending beyond the inner end of the latter, as shown in Fig. 2 for example. The lower boom C is pivoted to the turret B through the cheek plates 17ᵇ, the latter being straddled by the bifurcated extension 11 and having the pivot shaft 12 extending therethrough, as best shown in Fig. 5. As shown in the last-mentioned view, the pivot shaft 12, which is somewhat offset from the vertical axis of the turret B (see Fig. 4), is disposed beyond the inner end of the boom C and intermediate the ends of the cheek plates 17ᵇ. It will be understood that the cheek plates 17ᵇ form, in effect, a bifurcated extension of the boom C, the extension being somewhat offset from the longitudinal axis of the boom C, as shown in Fig. 4.

A pair of drums 20 are provided on the fitting 17, one drum 20 being rigid with each cheek plate 17ᵇ and disposed adjacent the end thereof nearest the inner end of the boom C, the drum being below the boom C in the position of the latter shown in Fig. 4. The drums 20, which are spaced apart, are arranged in axial alignment with one another. A pair of drums 21 are also provided on the fitting 17, one drum 21 being rigid with each cheek plate 17ᵇ and disposed adjacent the other end thereof. The drums 21, which are spaced apart, are also in axial alignment with one another. The drums 20 and 21 are disposed on the inner opposing faces of the plates 17ᵇ and have their axes disposed in a plane somewhat inclined with respect to the longitudinal axis of the lower boom C, as shown in Fig. 4. The axes of the drums 20 and 21 are spaced and positioned with respect to the axis of the pivot shaft 12 as shown in Fig. 4, and are substantially equidistant with respect to the latter. Two elongate cover plates 22 are provided in parallel and spaced-apart relation intermediate the cheek plates 17ᵇ, the plates 22 being of the form shown in Fig. 4. Each plate 22 covers and is secured to the inner end of one drum 20 and the inner end of one drum 21. Four rod members 23 may also be provided for reinforcement, two of the members 23 extending between each drum 20 and the corresponding drum 21 in spaced and substantially parallel relation. The rod members 23 may have their ends welded to the respective drums.

To effect swinging movement of the lower boom C on the pivot shaft 12, a cable 25 is trained over the drums 20 and a cable 26 is trained over the drums 21, the cables 25 and 26 being mounted for nontranslatory movement relatively to the respective drums. As best shown in Fig. 5, each end of the cable 26 is fixed to one cheek plate 17ᵇ, as at 17ᶜ. From the fixed ends thereof, parallel portions of the cable 26 extend downwardly (Fig. 5) over the respective drums 21, the bight of the cable extending over the upper end of an upwardly extending and upwardly movable fluid cylinder 28ᵃ forming an element of a fluid motor indicated generally at 28. A grooved block 19 is fixed to the upper end of the cylinder 28ᵃ to receive the transversely extending portion of the cable 26 and prevent the cable from slipping off the cylinder 28ᵃ. When the lower boom C is in the position of Fig. 4 or the position of Fig. 2, the drums 20 engage and bear down on the bight portion of the cable 26 to further inhibit dislocation of the cable 26 with respect to the cylinder 28ᵃ.

As shown in Fig. 5, the ends of the cable 25 are fixed to the bottom flange 28ᵇ of the upwardly movable cylinder 28ᵃ, as at 28ᶜ. As shown in the last-mentioned view, parallel portions of the cable 25 extend upwardly from the fixed ends thereof and are trained over the respective drums 20, the bight of the cable 25 extending toward the pivot shaft 12 from the upper regions of the drums 20 and extending over a transverse flange member 30. The flange member 30 depends from and is secured to the sleeve portion 17ᵃ of the fitting 17, the flange member 30 being disposed intermediate the cheek plates 17ᵇ. As shown in Fig. 4, the transversely extending portion of the cable 25 is sandwiched between the flange member 30 and a strengthening plate 31 extending between the cheek plates 17ᵇ in fixed relation thereto. An additional strengthening plate 32 is provided at the other side of the flange member 30 and spaced therefrom. As shown in Fig. 4, the transversely extending portion of the cable 25 abuts the under side of the sleeve portion 17ᵃ. To prevent dislocation of the transversely extending portion of the cable 25, an L-shaped bracket 33 is disposed on the plate 31 and fixed thereto, the bracket 33 having one arm thereof underlying the transversely extending portion of the cable, as shown in Fig. 4.

The aforementioned fluid motor 28 has a piston rod 28ᵈ relatively extensible from the cylinder 28ᵃ. The outer end of the piston rod 28ᵈ is pivoted to a bracket 35 fixed to the side of the turret B at the lower part thereof. From the foregoing it will be manifest that when fluid is admitted to the upper end of the cylinder 28ᵃ and discharged from the lower end, the cylinder rises pulling the cable 26 in a direction to raise the lower boom C from the inoperative position thereof, the upper end of the cylinder 28ᵃ swinging toward the pivot shaft 12 as the boom C rises toward the vertical. It will be understood that the cable 25 rises with the cylinder 28ᵃ to permit the outer end of the boom C to be raised. The cable 25 serves to prevent the boom from falling after passing the vertical or rearmost broken-line position of Fig. 1, and also serves to return the boom to the vertical. When the boom C is lowered from the vertical to the folded or inoperative position thereof, the cable 26 serves to prevent the boom from falling free while the cable 25, acting with the force of gravity on the boom, moves in a direction to lower the boom. Thus, it will be understood that the boom C, pivoted intermediate the ends thereof for swinging movement in a vertical plane, is operatively connected with the cable 25 intermediate the pivot shaft 12 and the end of the boom C pivotally connected to the boom D, and the cable 26 is operatively connected to the boom C intermediate the other end thereof and the pivot shaft 12. The action of each of the aforementioned cables checks or balances the action of the other. It will be understood that the drums 20 and 21 serve to reduce strain on the respective operative connections of the cables 25 and 26 with the boom C. In the illustrated form of the invention, the outer end of the lower boom C may be selectively positioned at any point along an arc of approximately 135°, the boom being swingable to the foremost broken-line position of Fig. 1.

A knuckle fitting 37 of aluminum alloy, at the outer end of the lower boom C, has a sleeve portion 37ᵃ snugly receiving and suitably secured to the outer end of the boom C which constitutes an elongate support for the boom D. The fitting 37 has a reinforced bifurcated portion 37ᵇ extending outwardly from the last-mentioned end of the boom C in an axial direction, the bifurcated portion 37ᵇ having the arms thereof receiving, at their distal ends, the ends of a horizontal pivot shaft 38 for pivotally mounting the upper boom D on the lower boom. At the inner end of the upper boom D an elbowed knuckle fitting 39 (see Fig. 6) of aluminum alloy is provided, the fitting 39 having a sleeve portion 39ᵃ snugly receiving and suitably secured to the inner end of the boom D. The fitting 39 has a bifurcated portion 39ᵇ inclined with respect to the axis of the upper boom D, as shown in Fig. 6 for example, and straddled by the portion 37ᵇ of the fitting 37, the arms 39ᶜ of the bifurcated portion 39ᵇ having the pivot shaft 38 extending therethrough intermediate their ends. Each arm 39ᶜ is generally of plate-like form and has a generally arcuate outwardly facing duplex cable seat 39ᵈ formed thereon and disposed in a vertical plane, the cable seat 39ᵈ being substantially concentric with the pivot shaft 38, and the seat 39ᵈ having an aperture adjacent each extremity thereof communicating with the respective ends of an elongate approximately linear passage 39ᵉ formed in the arm. Each arm 39ᶜ is also provided with a plurality of strengthening ribs 39ᶠ radiating from the portion of the arm surrounding the pivot shaft 38 and extending to the duplex cable seat 39ᵈ. In addition, each arm 39ᶜ has an upper strengthening flange 39ᵍ and a lower strengthening flange 39ʰ.

To effect swinging movement of the upper boom D on the axis of the pivot shaft 38 two cables 40 are provided, one cable 40 being associated with each arm 39ᶜ as best shown in Fig. 8. There is also provided a cable 41 (Fig. 8) associated with both arms 39ᶜ. Each cable 40 has one end thereof secured, as at 42, to a cross member 43 rigid with the piston rod 44 of a fluid motor 45 carried by the outer end portion of the lower boom C, the member 43 being disposed intermediate the ends of the piston rod 44. As shown in Fig. 7, each cable 40 has a portion thereof received in a portion of one of the duplex cable seats 39$^d$ and has the other end thereof (see Fig. 8) received in one of the passages 39$^e$ from one end of the latter. The cable 41 is disposed between the cables 40 and has the ends thereof entering and received within the respective passages 39$^e$ from their other ends. As shown in Fig. 8, the ends of the cable 41 overlap those ends of the cable 40 which are received in the passages 39$^e$ so that the cable ends are in laterally abutting relation within the respective passages. The aforementioned overlapping ends of the cables 40 and 41 received in the passages 39$^e$ are clamped therein in fixed position by two series of clamping members 46 spaced apart along the length of the passages 39$^e$ and extending through the respective arms 39$^c$. The bight of the cable 41 is received in a grooved crosshead 47 provided at the outer end of the piston rod 44 in fixed relation thereto, and parallel portions of the cable 41 are received in portions of the respective duplex cable seats 39$^d$ parallel to and adjacent the portions thereof receiving the cables 40, as shown in Fig. 7. As shown in Fig. 6, the piston rod 44, which may be of considerable length, is disposed below the lower boom C lengthwise of the latter, the piston rod 44 being extensible from the fluid cylinder 49 of the motor 45 and, in the position of Fig. 6, extending a distance beyond the knuckle fitting 39. The end of the cylinder 49 remote from the cross member 43 is pivoted to a bracket 50 fixed to the lower boom C. It will be understood that when hydraulic fluid is admitted to the end of the cylinder 49 nearest the cross member 43 and discharged from the other end, the piston rod 44 is moved in the direction of the arrow of Fig. 8 and is retracted. Upon retraction of the piston rod 44 the cables 40 are pulled in a direction to unseat or unwind the same from the respective duplex cable 39$^d$. Thus, when the booms C and D are in the positions shown in Fig. 8 and the piston rod 44 is retracted, the upper boom D is swung upwardly on the axis of the pivot shaft 38. The upper boom D is swingable to the broken-line positions thereof, shown in Fig. 1, and is swingable through an arc of 210°. It will be understood from the foregoing that the cables 40 serve to support and raise the upper boom D to the vertical in a manner somewhat similar to the manner in which the previously described cable 26 effects movement and support of the lower boom C. The cable 41 prevents the boom D from falling free when the boom D passes the vertical and serves to return the upper boom to the vertical when the piston rod 44 is moved in the opposite direction. From the vertical, the cable 41, acting with the force of gravity, returns the boom D to the inoperative or full-line position of Fig. 1 while the cables 40 prevent the boom D from falling free. The action of the cables 40 checks or balances the action of the cable 41, and vice versa. From the foregoing it will be understood that the action of the cable 41 is in some respects similar to the action of the previously described cable 25.

Figure 3:
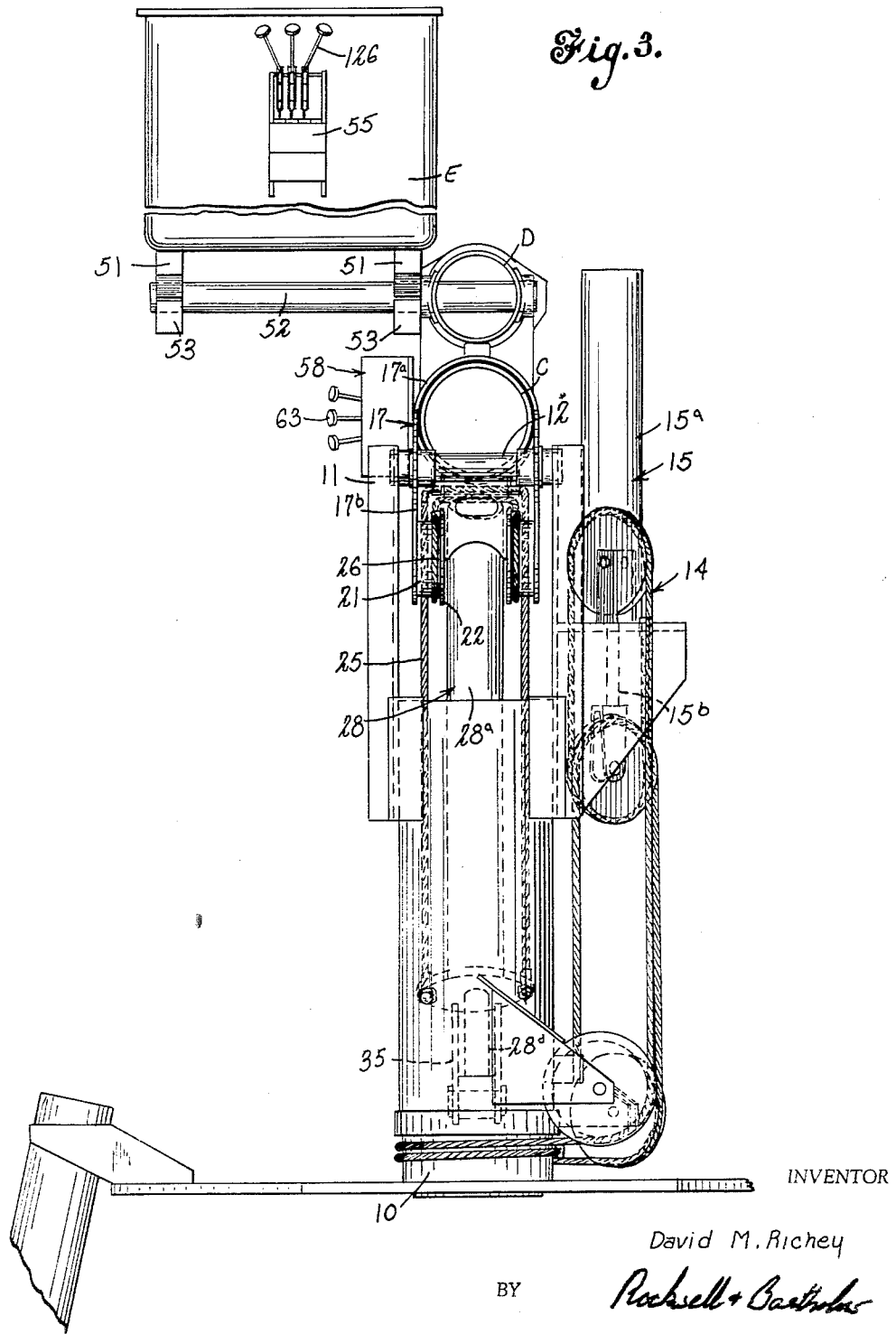
Fig. 3 is a further enlarged fragmentary view in front elevation showing the booms in their folded positions.

As shown in Fig. 3 for example, the crow's nest or work platform E at the outer end of the upper boom D is provided with two substantially parallel depending flanges 51 in laterally spaced relation extending transversely of a pivot shaft 52. The flanges 51 may be recessed as indicated in Fig. 4 to receive the shaft 52 adjacent the rear of the crow's nest E. A pair of recessed blocks 53 are provided for cooperation with the shaft 52, the blocks 53 clamping the shaft 52 to the respective recessed flanges 51 and being secured to the latter in a suitable manner (not shown), the construction and arrangement being such that the crow's nest E is angularly rigid with the shaft 52 during normal operation of the articulated boom structure. The crow's nest E, disposed at one side of the boom D and light in weight, is of bucket shape and is preferably formed of thermosetting plastic material reinforced with glass fibers. As shown in Fig. 3, the shaft 52, supporting the crow's nest E extends through the outer end of the boom D and is journaled therein. The articulated boom structure is provided with conventional means (not shown) for maintaining the crow's nest E in level position during swinging movement of the booms. The crow's nest is provided at a suitably convenient location with a control unit 55 for the hydraulic system so that complete control of the articulated boom structure may be effected by a person in the crow's nest.

Figure 9:
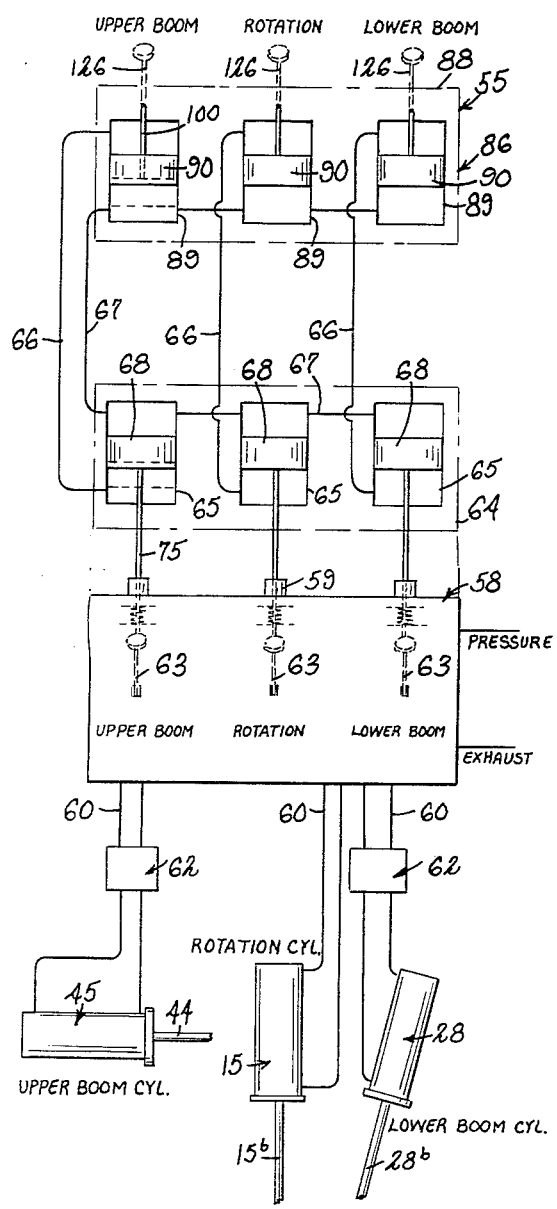
Fig. 9 is a diagrammatic view of the hydraulic system of the articulated boom structure.

In Fig. 9 there is shown a partial diagrammatic layout of the hydraulic system by which the rotatable turret B, the lower boom C, and the upper boom D are selectively operable from the control unit 55 by the workman in the crow's nest. In Fig. 2 for example, there is shown a reservoir for hydraulic fluid, indicated generally at 56, and a pump, indicated generally at 57, interposed in the outlet line from the reservoir to deliver fluid under pressure to the inlet side of a control unit 58 shown in Figs. 3 and 9. The control unit 58, having the outlet side thereof connected to the reservoir, is provided with three slide valves 59, one of the valves 59 controlling the operation of the turret B, another controlling the lower boom C, and the third controlling the upper boom D. Each valve 59 is spring biased to the neutral position thereof. The control unit 58, mounted on the fitting 17 of the lower boom, is provided with three pairs of feed lines 60, each pair being controlled by one of the valves 59. As shown in Fig. 9, the pairs of feed lines 60 are connected to the respective fluid motors operating the turret, the lower boom and the upper boom. As shown in the last-mentioned view, the feed lines 60 are connected to the respective ends of the fluid cylinders, the arrangement being such that fluid may be admitted and discharged from both ends of each fluid cylinder to impart movement to the piston therein. Two supplemental control units, indicated generally at 62 are provided, one control unit 62 being interposed in each pair of feed lines 60, except for the pair leading to the turret-operating fluid motor, as shown in Fig. 9. The control units 62 operating to restrict ingress and egress of hydraulic fluid from the respective boom-operating fluid motors will be described in detail hereinafter.

Associated with the control unit 58 is a cylinder block 64 having three cylinders 65 formed therein, as shown in Fig. 9. As shown in the last-mentioned view, each cylinder 65 has a feed line 66 connected to one end thereof. A feed line 67 interconnects the other ends of the cylinders 65, and each cylinder 65 has a piston 68 therein. The pistons 68 are fixed to the respective valves 59 of the control unit 58 to operate the latter. The control unit 58 is provided with manually operable control levers 63 having suitable operative connections (not shown) to the respective valves 59 so that full control of the articulated boom structure may be effected by a person standing near the turret and supported on the platform A of the truck. The control unit 58 is well known in the art and need not be described here in detail. For an understanding of the operation of the control unit 58 it will suffice to explain that each valve 59 has three positions: a neutral position in which hydraulic fluid circulates through the unit 58 and is returned to the reservoir; another position in which fluid is delivered to one end of one fluid cylinder and discharged from the other end; and a third position in which the flow of fluid in the feed lines 60 is reversed. Hence, it will be understood that when the valve 59 operatively associated with the fluid motor 45 operating the upper boom D, for example, is moved from the neutral position thereof in one direction, the piston rod 44 of the motor is retracted, thereby effecting swinging movement of the boom in one direction, while movement of the same valve 59 from the neutral position in the opposite direction effects extension of the piston rod 44 and consequent swinging movement of the upper boom in the opposite direction.

Figure 12:
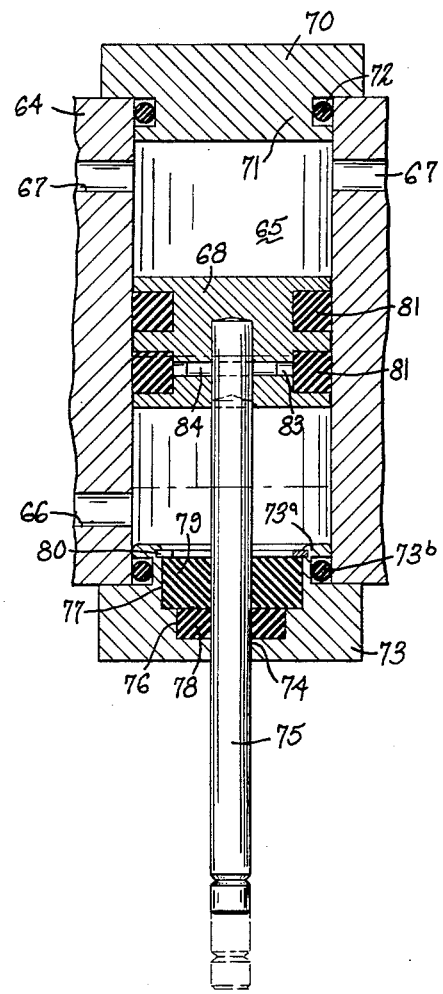
Fig. 12 is a fragmentary sectional view illustrating a hydraulically operated piston and piston rod in the hydraulic system.

The control unit 55, together with the cylinder block 64, feed lines 66, 67, pistons 68 and other appurtenant parts to be described hereinafter, constitutes a servo hydraulic system for operating the control unit 58 from the remote location of the unit 55 mounted on the crow's nest. There is shown in Fig. 12 one of the cylinders 65 formed in the block 64 and receiving one piston 68 which may have a suitable fixed connection (not shown) with the valve 59 operating the fluid motor associated with the upper boom D, for example, the other cylinders 65 and pistons 68 being constructed in like manner. As shown in the last-mentioned view, one end of the cylinder 65 is sealed by a cylinder cap 70 having an integral portion 71 forming with the cylinder wall an O-ring chamber receiving an O-ring 72 having sealing engagement with the cap and the cylinder wall. The cap 70 may be secured to the cylinder block 64 by suitable bolts, not shown. At the other end thereof, the cylinder 65 is closed by a cylinder cap 73 having an integral portion 73$^a$ forming with the cylinder wall an O-ring chamber receiving an O-ring 73$^b$ having sealing engagement with the cap 73 and the cylinder wall. The cap 73, which may be secured to the cylinder block 64 by suitable bolts, not shown, is provided with a bore 74 extending therethrough and receiving a piston rod 75 connected with the piston 68. The bore 74 is enlarged by an inwardly facing counterbore 76 and further enlarged by an inwardly facing counterbore 77. A sealing member 78 of rubber-like material embracing the piston rod 75 is disposed in the counterbore 76. A similar sealing member 79 is disposed in the counterbore 77 in abutting relation to the member 78. Dislocation of the sealing members 78, 79 is inhibited by a split ring 80 extending into a groove formed in the portion 73 and partially overlying the member 79 in abutting relation. As shown in Fig. 12, the piston 68 is provided with a pair of spaced piston rings 81 of rubberlike material having sealing engagement with the side-wall structure of the cylinder 65 and extending into suitable circumferential grooves formed in the piston 68. The inner end of the piston rod 75 extends into and is secured to the piston 68 in the manner shown in Fig. 12, the piston 68 having a transverse bore 83 formed therein receiving a pin 84 extending through the inner end portion of the piston rod 75. The ends of the bore 83 are closed by one of the piston rings 81 in the manner shown in Fig. 12.

As shown in Fig. 9, the feed lines 66, 67 associated with the cylinder block 64 lead to the control unit 55. The control unit 55 includes a composite cylinder block, indicated generally at 86, constituted by a lower block member 87 (see Fig. 11) and an upper block member 88, the members 87, 88 being secured together as by bolts, not shown. As shown diagrammatically in Fig. 9, the cylinder block 86 has three cylinders 89 formed therein. The aforementioned feed lines 66, leading from the cylinder block 64, are connected with the respective upper ends of the cylinders 89 while the other ends of the cylinders 89 are interconnected by the feed line 67 leading from the block 64, as shown in Fig. 9. Each cylinder 89 has a piston 90 therein, one piston 90 with its appurtenant parts being shown in Fig. 10A. As shown in Fig. 11, the upper end of the cylinder 89 is closed by a cylinder cap 91 similar to the above-described cap 73 with its appurtenant parts. The cap 91 may be secured to the upper block member 88 by suitable bolts, not shown. The cylinder 89 is provided with a diametrically enlarged extension portion 92 formed in the block member 87, as shown in Fig. 11. Adjoining the cylinder portion 92, there is provided an extension portion 94 of somewhat smaller diameter than the upper portion of the cylinder 87 and closed at the bottom thereof by an integral part of the block member 87.

As shown in Fig. 10A, the piston 90 is of composite structure including an upper element, indicated generally at 95, having an integral portion 96 grooved circumferentially to receive a piston ring 97 of rubber-like material for sealing engagement with the side-wall structure of the cylinder 89. Below the portion 96, the element 95 is provided with an integral portion 98 of reduced diameter spaced from the cylinder wall. The element 95 is provided with a concentric bore 99 through which a piston rod 100 extends with clearance, the piston rod 100 extending through the cap 91. The bore 99 is enlarged by a downwardly facing counterbore 101 communicating with a plurality of radial ports 101$^a$ extending through the portion 98. The bore 99 is further enlarged by downwardly facing counterbore 101$^b$ below the ports 101$^a$.

The composite piston structure shown in Fig. 10A also includes a lower element, indicated generally at 102, having an integral portion 103 grooved circumferentially to receive a piston ring 104 of rubber-like material for sealing engagement with the cylinder wall. The element 102 has an integral upper portion 105 of reduced diameter spaced from the cylinder wall, the portion 105 having a socket 106 formed in the upper extremity thereof into which the portion 98 of the element 95 extends and is secured by rivets 107. The lower element 102 is provided with a concentric bore 108 threaded throughout the lower part thereof to receive a threaded end of a shaft 109. Above the last-mentioned end of the shaft 109, the bore 108 is enlarged by an upwardly facing counterbore, as at 110, and is further enlarged by an upwardly facing counterbore 111 extending through the bottom of the socket 106. It will be understood that the socket 106 is formed by an upwardly facing counterbore enlarging the bore 108 to an even greater extent at the upper extremity of the portion 105. A plurality of radial ports 112 are provided communicating with the counterbore 111 and extending through the periphery of the portion 105 below the socket 106. A plurality of ports 113 communicate with the counterbore 110 and diverge from the latter in the manner shown in Fig. 11, the ports 113 extending through the bottom of the element 102.

Figure 10:
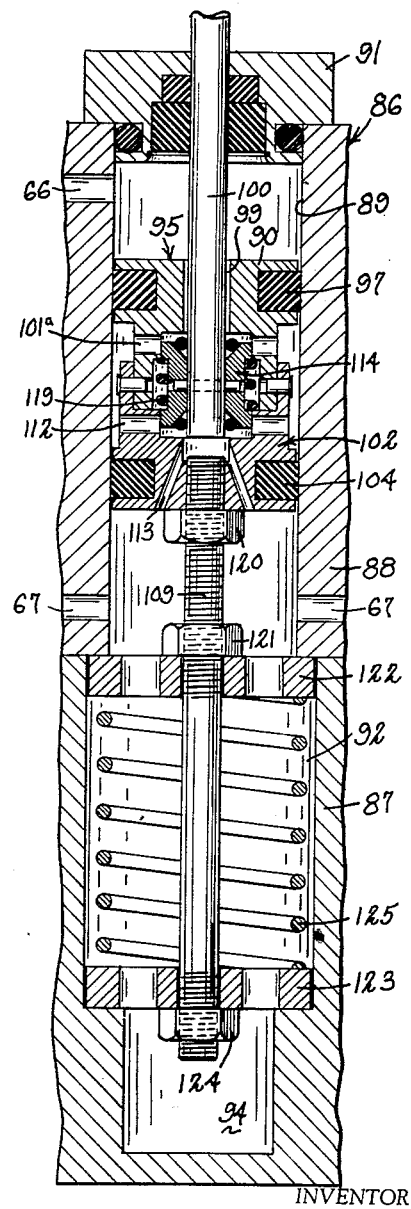
Fig. 10 is a fragmentary sectional view illustrating a manually operable valve in the hydraulic system.
Figure 11:
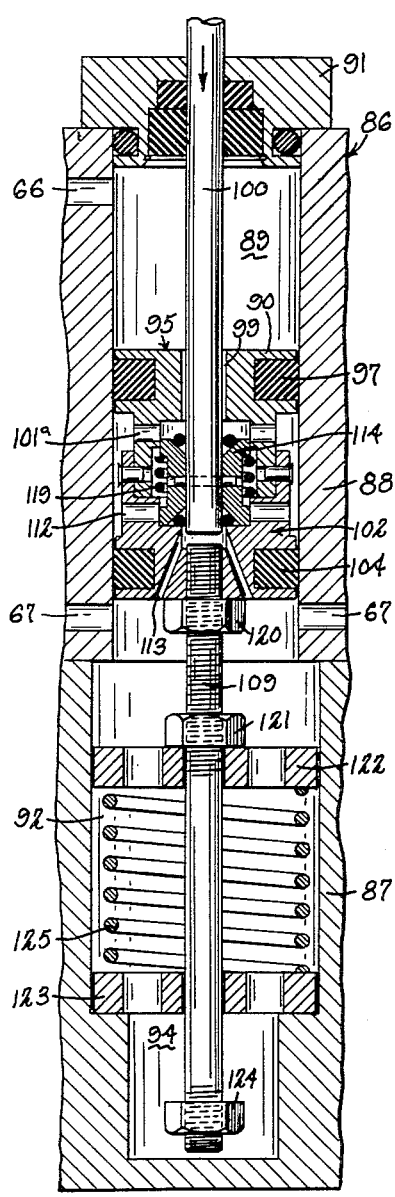
Fig. 11 is a view similar to Fig. 10 showing the valve in another position.

As best shown in Fig. 10A, a generally cylindrical valve member 114 extends into the opposing counterbores 101 and 111 for sliding movement relatively to the piston 90. The member 114 receives the piston rod 100 in the manner shown in Fig. 10A. The valve member 114, having a central portion 115 of reduced diameter, is secured to the inner end of the piston rod 100 by a pin 116 received in a substantially central cross bore formed in the member 114, the pin 116 extending through the inner end portion of the rod 100 in a transverse direction. A pair of sealing rings 117 are provided and inhibit the flow of hydraulic fluid along the portion of the rod 100 extending through the valve member 114, one sealing ring 117 being disposed at each end of the member 114 in tightly embracing relation to the rod 100. As shown in Fig. 10A, each end of the member 114 is recessed, as at 118, to provide a seat for one sealing ring 117. The ends of the valve mamber 114 fit snugly within the respective counterbores 101, 111. A helical compression spring 119, embracing the portion 115 of the valve member, constantly urges the valve member to the neutral position thereof in which the ports 101$^a$ and 112 are only partially closed by the member 114, as shown in Fig. 10A. As best shown in Fig. 10A, the spring 119 is interposed in the space between the middle portion 115 of the valve member and the side wall of the counterbore 101$^b$. The arrangement is such that when the valve member 114 is moved from the position of Fig. 10 to the position of Fig. 11 by downward movement of the piston rod 100, the spring 119 is further compressed between the enlarged upper end of the member 114 and the bottom of the counterbore 106. It will be understood that when the member 114 is moved from the neutral position to the other closed position thereof by movement of the piston rod 100 in the opposite direction, the spring 119 is compressed between the enlarged lower end of the member 114 and the bottom of the counterbore 101b. In the last-mentioned position of the valve member 114, the ports 101a are sealed off from the bore 99 by engagement of the upper sealing ring 117 with the bottom of the counterbore 101. When the valve member 114 is in the position of Fig. 11, the ports 112 are sealed off from the bore 110 by engagement of the lower sealing ring 117 with the bottom of the counterbore 111.

The shaft 109 threaded into the lower end of the composite piston 90 is secured in adjusted position with respect thereto by a lock nut 120. A nut 121 is threaded on the shaft 109 below and in spaced relation to the nut 120, to serve as an abutment for a spring compressor plate 122 loosely received on the shaft 109. A spring compressor plate 123 is loosely received on the shaft 109 below and in spaced relation to the plate 122, and a nut 124 is threaded on the shaft 109 below the plate 123 to serve as an abutment for the latter. The spring compressor plates 122, 123 are separated by a compression spring 125 embracing the shaft 109. The plates 122, 123 are perforated to permit the flow of hydraulic fluid therethrough. As indicated in Fig. 10 for example, the spring compressor plates 122, 123 are snugly received in the cylinder portion 92, and upward movement of the plate 122 is limited by engagement of the latter with the upper block member 88, while downward movement of the plate 123 is limited by engagement of the latter with the bottom of the counterbore forming the cylinder portion 92. From the foregoing disclosure, it will be apparent that the construction and arrangement is such that the spring 125 constantly urges the composite piston 90 toward the neutral position shown in Fig. 10. It will be understood that when the piston rod 100 is moved from the neutral position in the direction of the arrow of Fig. 11, downward movement of the compressor plate 122 is effected through the nut 121 to further compress the spring 125 from the upper end of the latter. It will also be understood that when the piston 90 is moved from the neutral position in the opposite direction, the spring 125 is compressed from the other end thereof by the compressor plate 123, upward movement of the latter being effected thorough the nut 124.

Three toggle levers 126 (see Fig. 3) are provided for manual operation of the respective pistons 90, the levers 126 being suitably mounted on the control unit 55 located on the crow's nest E. Each lever 126 has a suitable connection (not shown) to one piston rod 100 to impart reciprocating movement to the latter when the lever is swung upwardly and downwardly from the neutral position thereof.

The operation of the servo hydraulic system is as follows. When the toggle lever 126 controlling the upper boom, for example, is swung upwardly from the neutral position thereof by the operator in the crow's nest, the piston rod 100 operatively associated therewith is moved in a downward direction carrying with it the valve 114 which is moved relatively to the piston 90 to the position of Fig. 11, thereby closing off circulation of hydraulic fluid from one side of the piston 90 to the other. Continued upward swinging movement of the toggle lever 126, through further movement of the valve member 114, effects downward movement of the piston 90 to the broken-line position of Fig. 9. When the pressure of hydraulic fluid below the piston 90 operating the upper boom is increased by movement of the piston to the broken-line position of Fig. 9, the pressure is transmitted to the lower ends of the cylinders 89 operatively associated with the turret B and the lower boom C through the feed line 67. However, when the valve members 114 associated with the pistons 90 operatively connected to the turret and the lower boom are each in the neutral position of Fig. 10, the pressure at both sides of each of the last-mentioned pistons 90 is equalized by the circulation of fluid from one side of each piston to the other through the ports 113, the counterbore 110, the counterbore 111, the ports 112, the space between the cylinder wall and the portion 105 of the piston, the ports 101a, the counterbore 101, and the space between the piston rod 100 and the portion 96 of the piston. Hence, the pistons 90 associated with the turret and the lower boom are unaffected by downward movement of the piston 90 operatively associated with the upper boom. Furthermore, it will be understood that the aforementioned equalization of fluid pressure effects equalization of pressure at both sides of the pistons 68 operatively connected to the turret and the lower boom through the feed lines 66 and 67. Thus, when the piston 90 operatively connected to the upper boom is moved downwardly to the broken-line position of Fig. 9 from the full-line position thereof by operation of the toggle lever 126 associated therewith, the piston 68 operatively associated with the upper boom is moved from the full-line position to the broken-line position of Fig. 9 to effect movement of the valve 59 associated therewith, while the other pistons 68 remain in their neutral positions. It will also be understood that when upward pressure on the last-mentioned manually operable toggle lever 126 is released, the valve member 114 operatively associated therewith is returned to neutral position by the spring 119 and the piston 90 is returned to the neutral poistion thereof by the action of the spring 125. Movement of the piston 90 to the neutral position effects return of the piston 68 to the neutral position through movement of the spring-biased valve 59.

From the foregoing, it will be apparent that when the last-mentioned toggle lever 126 is swung from the neutral position in the opposite direction, the valve member 114 associated therewith is moved upwardly with the piston rod 100, closing the ports 101a and effecting upward movement of the piston 90 from the neutral position thereof. Upward movement of the piston 90 increases the fluid pressure in the upper part of the cylinder and this pressure is transmitted to the lower end of the cylinder 65 operatively associated therewith through the feed line 66. This effects upward movement of the piston 68 in the last-mentioned cylinder to impart movement to the operatively associated valve 59 in the opposite direction. When downward pressure on the toggle lever 126 is released, the valve member 114 is returned to the neutral position thereof by the spring 119. The piston 90 is returned by the action of the spring 125 and effects return of the piston 68 to the neutral position thereof through movement of the spring-biased valve 59. The servo hydraulic system, which is a low pressure self-contained system, may be equipped with a small reservoir, not shown.

The provision of the servo hydraulic system obviates the need for extending the high pressure lines 60 to the outer end of the articulated boom structure, thereby conserving pressure. Furthermore, the use of the servo system reduces the weight carried by the booms inasmuch as it would otherwise be necessary to mount the heavy control unit 58, with its numerous appurtenant lines 60, on the crow's nest. In the low pressure servo system the lines 66 and 67, which total only four, may be small in diameter and light in weight.

One of the above-mentioned control units or restrictors 62 is illustrated diagrammatically in Fig. 13, the restrictor shown in this view being the one operatively associated with the upper boom, the other restrictor 62, associated with the lower boom, being identical. As mentioned above, the restrictor 62 interposed in the high pressure lines 60 leading from the control unit 58 to the fluid motor cylinder 49 operatively associated with the upper boom restricts egress of fluid from the cylinder 49 and may be physically incorporated in a suitable manner, not shown, in the structure of the cylinder 49.

The restrictor 62, shown in Figs. 13, 14 and 15, comprises a valve casing or block 130 for having two cylinders formed therein, as at 131. Each cylinder 131 has an extension portion 132 of substantially smaller diameter than the body of the cylinder and terminating in an endwise extension portion 133 of still smaller diameter, the cylinders 131 with their extension portions being reversely arranged with respect to one another as shown in Fig. 13, for example. As shown in Fig. 14, the cylinder extension portions 133 are formed by bores extending into the casing 130 from opposite sides thereof and terminating in the body of the casing, each bore being enlarged by a counterbore to form one extension portion 132 and being further enlarged by another counterbore to form the body of one cylinder 131. Each of said last-mentioned bores is further enlarged to receive a cylinder cap 134 having a part 134a threaded into the casing 130. As best shown in Fig. 14, each cylinder cap 134 is provided with an inner part 134b snugly received in one of said bores in the casing 130 and of slightly smaller diameter than the part 134a. The part 134b of each cylinder cap is provided with a circumferential groove 134c communicating with a radial passage 134d connected to a vertical concentric passage 134e extending through the inner end of the part 134b, the groove 134c being in direct communication with a lateral fluid passage 135 formed in the block 133, as shown in Fig. 14. As illustrated in Fig. 14, the outer ends of the lateral fluid passages 135, extending through opposite sides of the casing 130, are closed by suitable plug members 136 threaded into the casing. Also as shown in the last-mentioned view, a pair of lateral fluid passages 137 are provided, one passage 137 extending through each of the last-mentioned sides of the casing and leading to the respective counterbores 132. As shown in Fig. 13 for example, each fluid passage 137 leads into one of the counterbores 132 adjacent the bottom thereof. The passages 137 are directly connected to the respective fluid lines 60 leading from the control unit 58 in the illustrated form, and as shown in Fig. 14, the passages 137 are provided with enlarged threaded parts receiving threaded nipples 138 forming terminals for the last-mentioned lines 60. A pair of fluid passages 140 are formed in the casing at right angles to the passages 137, each passage 140 being of a diameter slightly in excess of the diameter of the cylinder extension portions 133 and intersecting one fluid passage 135. Each passage 140 is also of a diameter somewhat larger than the diameter of the passages 135. The fluid passages 140 in the illustrated form are directly connected to the respective fluid lines 60 leading from the motor cylinder 49, the last-mentioned lines 60 having nipples 141 forming terminals for the respective lines and threaded into enlargements in the respective passages 140 extending to one face (see Fig. 15) of the casing.

Two pistons 142 are provided, one piston 142 being disposed in the body portion of each cylinder 131. Two shuttle valves 143 are provided for cooperation with the respective pistons 142, one of the valves 143 being shown in detail in Fig. 16 and the other being identical. The valve 143 shown in Fig. 16 has a cylindrical body portion 144 adjoining a tapered portion 145 leading to a neck 146 terminating in a flat head 147. The cylindrical body portion 144 of the valve has a longitudinal bore 148 formed therein extending through one end of the valve and terminating adjacent the portion 145. The valve portion 144 is also provided with a cross bore 149 extending therethrough and communicating with the bore 148 intermediate the ends of the latter. The body portion 144 of the valve is also provided with two cross bores 150 extending therethrough and communicating with the bore 148, the cross bores 150 being disposed at opposite sides of the cross bore 149 (see Fig. 16) and extending at right angles thereto.

The shuttle valves 143 are disposed in the valve casing 130 in the manner shown in Fig. 14, the body portion 144 of each valve extending into one cylinder portion 133 and the head 147 of the valve being engageable with the corresponding piston 142. As shown in the last-mentioned view, two compression springs 152 are provided, one spring 152 embracing each valve 143 and being interposed between the head 147 thereof and the bottom of the corresponding counterbore 132 to urge the valve to the closed position thereof.

The operation of the restrictor 62 associated with the upper boom, for example is as follows. When the manually operable toggle lever 126 operatively associated with the upper boom is moved from the neutral position thereof to a position to effect extension of the boom-operating piston rod 44 from the fluid cylinder 49, hydraulic fluid is directed from the control unit 58 through the left line 60 (see Fig. 13) to one fluid passage 137 and into the corresponding cylinder extension 132 of the restrictor. The valve 143 extending into the last-mentioned cylinder extension 132 is lifted and moved to the open position thereof by the pressure of fluid on the tapered portion 145 thereof. When the last-mentioned valve 143 is open, fluid flows from the cylinder extension 132 into the corresponding fluid passages 135 and 140. Fluid flowing through the last-mentioned passage 140 passes into the left line 60 (Fig. 13) leading from the restrictor 62 to the corresponding end of the motor cylinder 49. Fluid flowing through the last-mentioned passage 135 passes into the corresponding groove 134c and through the corresponding passages 134d and 134e to the upper end of the right cylinder 131 (Fig. 13), thereby forcing the corresponding piston 142 downwardly to engage the head of the corresponding valve 143. Downward movement of the last-mentioned piston 142 effects movement of the last-mentioned valve 143 to the open position thereof, thereby permitting fluid to escape from the other end of the motor cylinder 49 through the right line 60 (Fig. 13) leading from the latter and through the corresponding passage 140 into the right cylinder extension 132 of the restrictor. Fluid entering the last-mentioned cylinder extension 132 escapes through the corresponding passage 137 and passes back to the control unit 58 through the right line 60 (Fig. 13) leading from the restrictor 62. Thus it will be understood that movement of the last-mentioned toggle lever 126 in one direction from the neutral position thereof effects movement of hydraulic fluid through the restrictor 62 operatively associated therewith to effect extension of the piston rod 44 operating the upper boom D. It will also be understood that movement of the same toggle lever 126 from the neutral position thereof in the opposite direction effects a reverse flow of fluid through the last-mentioned restrictor 62 to retract the piston rod 44 operatively associated with the upper boom D. The valves 143 are provided with the passages 148, 149 and 150 to prevent fluid from being trapped in the cylinder extensions 133 when the valves are moved to their open positions.

When the last-mentioned toggle lever 126, for example, is returned to the neutral position thereof, the valves 143 in the restrictor 62 operatively associated therewith tend to return to their closed positions. However, when the upper boom D is in a position such that the weight thereof exerts a thrust on the piston rod 44 in a direction tending to retract the latter for example, the restrictor 62 effectively inhibits the escape of fluid from the motor cylinder 49 in the following manner. Fluid tending to escape from the left end of the upper boom cylinder shown diagrammatically in Fig. 13 may pass through the left passage 140 and through the corresponding passage 135 to exert a downward pressure on the right piston 142, thereby opening or maintaining in open position the right valve 143 shown in Fig. 13. Thus, fluid tending to escape from the left end of the fluid cylinder shown in Fig. 13, tends to be trapped above the right piston 142. Furthermore, as the thrust on the piston rod 44 in the present instance is in a direction tending to reduce fluid pressure in the right end of the upper boom cylinder shown in Fig. 13, there is little or no tendency for fluid to pass from the last-mentioned end of the fluid cylinder past the open right valve 143, to open the left valve 143. Thus it will be understood that when a force, such as the weight of the upper boom, is exerted on the piston rod 44 tending to retract the latter, the left valve 143 remains closed tending to inhibit escape of fluid from the left end of the fluid cylinder shown in Fig. 13. Conversely, when such a force is exerted on the piston rod 44 tending to extend the latter, the other valve 143 remains closed to inhibit escape of fluid from the right end of the fluid cylinder shown in Fig. 13. It will be understood that the operation of the restrictor 62 associated with the lower boom C is identical to that of the above-described restrictor 62 associated with the upper boom D.

In accordance with the foregoing disclosure there is provided an articulated boom structure for carrying a workman aloft, which structure is extremely flexible and which is particularly useful for employment in the operation of clearing tree limbs from the area of overhead utility lines. In this connection, it may be noted that the work platform of the structure may be lifted over an obstacle and then lowered to an extent at the side of the obstacle remote from the vehicle or other means supporting the boom structure. The booms of the structure have great amplitude of movement.

Also in accordance with the disclosure, there is provided in a structure including multiple booms improved means for operating the booms. Furthermore, there is provided in accordance with the disclosure improved controls and valve means in an articulated boom structure operable by hydraulic means. From the foregoing disclosure it will also be apparent that there is provided an articulated boom structure having a high degree of safety, which is constructed of relatively few and rugged parts, and which is economical to produce.

While only one form of the articulated boom structure has been illustrated and described herein, it will be apparent that various modifications and changes in the structure may be effected without departure from the principles of the invention and the scope of the appended claims.

What I claim is:

1. In an articulated boom structure having a lower platform element supporting in pivotal relation a lower boom element, and having an upper boom member in pivotal relation to said boom element and carrying an upper work platform, the combination of a pair of fluid motors, one motor having a part connected to the platform element and being operatively associated with said boom element to swing the latter on the pivotal axis thereof, the other motor being carried by said boom element and being operatively associated with said boom member to swing the latter relatively to the boom element, a primary hydraulic control unit mounted on one of said elements and connected to said motors by high pressure feed lines, said primary unit being provided with valves controlling the feed lines of the respective motors, and servo hydraulic means operable from said upper work platform and including a manually operable control unit mounted on said work platform and low pressure feed lines operatively associated with said valves.

2. In a boom structure, an elongate support element, a boom having a bifurcated extension at one end having the arms thereof pivoted to said support element for swinging movement of the boom in a vertical plane, the arms being inclined with respect to the longitudinal axis of the boom, each arm having an arcuate duplex cable seat formed thereon in concentric relation to the pivotal axis of the boom and disposed in a vretical plane, a pair of cables extending into the respective cable seats and each having one end thereof anchored to one arm, a third cable having the ends thereof anchored to the respective arms and having parallel portions thereof extending into the respective cable seats and adapted to wind thereon as said pair of cables unwinds, and cable-operating means on said support element operatively connected to the other ends of said pair of cables and to a portion of the third cable intermediate the ends of the latter, to effect winding and unwinding of said cables on the respective cable seats to thereby effect swinging movement of the boom on said support element.

3. In a boom structure, an elongate support element, a boom having a bifurcated extension at one end having the arms thereof pivoted to said support element for swinging movement of the boom in a vertical plane, the arms being inclined with respect to the longitudinal axis of the boom, each arm having an arcuate duplex cable seat formed thereon in concentric relation to the pivotal axis of the boom and disposed in a vertical plane, actuating means for the boom comprising a shaft movable lengthwise of said support element and supported from the latter, the last-named shaft having a rigid cross member intermediate the ends thereof and having a free end extensible beyond said arms, and cable means operatively connecting the last-named shaft and the boom to effect swinging movement of the latter relatively to said support element, said cable means comprising lengths of cable anchored to said cross member and each having a part thereof extending into one cable seat and anchored to one arm, said cable means also comprising a cable having parallel portions thereof extending into the respective cable seats to wind thereon as said lengths of cable unwind and having the ends thereof anchored to the respective arms, the middle portion of the last-named cable extending over said free end of the last-named shaft in fixed relation thereto.

4. In a boom structure, an elongated support element, a boom having extension means at one end pivoted to said support element for swinging movement of the boom in a vertical plane, said extension means including an arcuate cable seat in concentric relation to the pivotal axis of the boom and disposed in a vertical plane, cable means including a first cable extending into said cable seat and having a part thereof in fixed relation to said extension means, said cable means comprising a second cable extending into said cable seat from the opposite direction to wind thereon as the first cable unwinds and having a part thereof in fixed relation to said extension means, and means supported on said support element and operatively connected to said cable means to impart swinging movement to the boom, the last-named means comprising a shaft movable lengthwise of said support element and having a rigid cross member intermediate the ends thereof, the shaft having a free end extensible beyond said extension means, the first cable having a part thereof fixed to said cross member and the second cable having a part thereof fixed to said free end of the shaft.

5. In a boom structure such as described, an elongate supporting member, a boom having extension means at one end receiving a pivot shaft supported by said supporting member to pivot the boom for swinging movement in a vertical plane, motor means on said supporting member comprising an elongate element extensible generally lengthwise of said supporting member, said element having an outer free end extensible beyond said pivot shaft and having a fixed inner part extensible to a position short of said pivot shaft, and operative means of connection between said element and said extension means for imparting swinging movement to said boom, said operative means of connection comprising a first cable having the ends thereof fixed to said extension means and having the middle portion thereof fixed to said free end of the motor element, and said operative means of connection comprising a second cable having an end fixed to said inner part of the motor element, the second cable having a part thereof fixed to said extension means.

6. A boom structure as defined in claim 5, wherein said extension means comprises a bifurcated member having the arms thereof receiving said pivot shaft intermediate their ends.

7. A boom structure as defined in claim 6, wherein parallel portions of the first cable extend beyond the pivot shaft, and the ends of the first cable are secured to the respective arms of the bifurcated member.

8. A boom structure as defined in claim 7, wherein the part of the second cable which is fixed to the extension means is the middle part, and the other end of the second cable is fixed to said inner part of the motor element.

9. A boom structure as defined in claim 8, wherein said motor means is supported on said supporting member for swinging movement in a vertical plane.

10. In a boom structure, a rotary vertically elongated support element, a boom having a pivot intermediate the ends thereof and mounting the boom on said support element for swinging in a vertical plane, motor means mounted on said support element and comprising an elongate upwardly directed and longitudinally movable motor element having a free end extensible beyond said pivot, said motor element having a lower fixed part extensible to a position short of said pivot, cable means fixed to said free end of the motor element and secured to the boom at one side of the pivot, effecting swinging movement of the boom toward and past the vertical when said motor element is extended fully in an upward direction, and cable means fixed to said inner part of the motor element and secured to the boom at the other side of said pivot, balancing the action of the first-named cable means and effecting the return of the boom to the vertical.

11. In a boom structure such as described, an elongate supporting member, a boom having a bifurcated extension at one end and carrying intermediate the ends of the arms of the extension a pivot shaft supported by said supporting member to pivot the boom for swinging movement in a vertical plane, motor means on said supporting member comprising an elongate element extensible generally lengthwise of said supporting member, said element having an outer free end extensible beyond the pivot shaft and having a fixed inner part extensible to a position short of said pivot shaft, and cable means for imparting swinging movement to said boom and comprising parallel cable portions fixed to the respective arms of the bifurcated extension at one side of the pivot shaft and extending to the other side to form a loop disposed over the free end of said motor element, said cable means also including parallel cable portions fixed to the respective arms of the extension to balance the action of the first-named cable portions and each having a part thereof secured to said fixed part of said motor element.

12. In a boom structure, a rotary vertically elongated support element, a boom having a bifurcated extension at one end provided with a pivot intermediate the ends of the arms of the bifurcated extension and mounting the boom on said support element for swinging movement in a vertical plane, motor means mounted on said support element and comprising an elongate upwardly directed and longitudinally movable motor element having a free end extensible beyond said pivot, said motor element having a lower fixed part extensible to a position short of said pivot, two pairs of drums on said extension, one pair of drums being disposed on arms at one side of the pivot and the other pair being disposed on the respective arms at the other side of the pivot, cable means for imparting swinging movement to said boom and comprising parallel cable portions fixed to the respective arms of the extension at one side of the pivot and normally trained over the respective drums at the last-mentioned side of the pivot, said cable portions extending to the other side of the pivot to form a loop disposed over the free end of said motor element to effect swinging movement of the boom toward and past the vertical when said motor element is extended fully in an upward direction, said cable means also including parallel cable portions fixed to the respective arms of the extension to balance the action of the first-named cable portions and effect the return of the boom to the vertical, the balancing cable portions normally being trained over the respective drums at said other side of the pivot and each having a part thereof secured to said fixed part of said motor element.

13. In a boom structure, a lower supporting element, a boom having a pivot intermediate the ends thereof and mounting the boom on said supporting element for swinging in a vertical plane, motor means mounted on said element and comprising an elongate longitudinally movable motor element having a free end extensible beyond said pivot, said motor element having a part thereof extensible to a position short of said pivot, cable means fixed to said free end of the motor element and secured to the boom at one side of the pivot, effecting swinging movement of the boom toward and past the vertical when and as said motor element is extended fully, and cable means fixed to said part of the motor element and secured to the boom at the other side of said pivot, balancing the action of the first-named cable means and effecting the return of the boom to the vertical on retraction of said motor element.

14. In a boom structure, a lower supporting member, a boom having intermediate of its ends a pivot shaft supported on said member to pivot the boom for swinging movement in a vertical plane, motor means on said member comprising an elongated element extensible lengthwise thereof, said element having an outer free end extensible beyond the pivot shaft and having an inner part extensible to a position short of said pivot shaft, and cable means for imparting swinging movement to said boom toward and past the vertical and comprising parallel cable portions fixed to the boom at one side of the pivot shaft and extending to the other side and being fixed to the free end of the motor element, said cable means also including parallel cable portions fixed to the boom to balance the action of the first-named cable portions and each having a part thereof secured to said inner part of the motor element.

References Cited in the file of this patent

UNITED STATES PATENTS

| | | |
|---|---|---|
| 2,500,815 | Gerli et al. | Mar. 14, 1950 |
| 2,552,848 | Gabriel et al. | May 15, 1951 |
| 2,600,702 | Stephens | June 17, 1952 |
| 2,605,002 | Graves | July 29, 1952 |
| 2,616,768 | Stemm | Nov. 4, 1952 |
| 2,643,515 | Harsch | June 30, 1953 |
| 2,666,417 | Harsch | Jan. 19, 1954 |
| 2,815,250 | Thornton-Trump | Dec. 3, 1957 |